United States Patent [19]

Marks

[11] Patent Number: 6,025,847
[45] Date of Patent: Feb. 15, 2000

[54] THREE DIMENSIONAL MODELING SYSTEM WITH VISUAL FEEDBACK

[75] Inventor: Richard Lee Marks, Pleasanton, Calif.

[73] Assignee: Auto Desk, Inc., San Rafael, Calif.

[21] Appl. No.: 08/997,225

[22] Filed: Dec. 23, 1997

[51] Int. Cl.[7] .................................................. G06T 17/00
[52] U.S. Cl. ........................................ 345/419; 345/420
[58] Field of Search .................................. 345/418, 419, 345/427, 420, 423, 424

[56] References Cited

U.S. PATENT DOCUMENTS

| | | | |
|---|---|---|---|
| 5,838,328 | 11/1998 | Roller | 345/420 |
| 5,883,630 | 3/1999 | O'Donnell et al. | 345/420 |
| 5,903,682 | 5/1999 | Chun | 345/419 |
| 5,917,494 | 6/1999 | Arai et al | 345/419 |
| 5,933,153 | 8/1999 | Deering et al. | 345/420 |
| 5,940,079 | 8/1999 | Morino et al. | 345/419 |

Primary Examiner—Phu K. Nguyen
Assistant Examiner—Cliff N Vo
Attorney, Agent, or Firm—Kent R. Richardson; Wilson, Sonsini, Goodrich & Rosati

[57] ABSTRACT

One embodiment includes a method of generating a 3D model from an image using a computer system. The image is of an arrangement of physical objects. The method comprises the following. Display the image. Create a 3D model primitive to represent at least a portion of a physical object in the image by specifying a set of parameters that correspond to a first set of locations of the primitive on the image. Modify the primitive to make it more closely match the location of the physical object in the image by specifying a second set of locations on the image for the primitive. Display a 2D representation of the primitive, including displaying a difference between the first set of locations and the second set of locations of the primitive on the image. In one embodiment, displaying the difference between the first set of locations and the second set of locations helps a user to see where the user is moving part a primitive from. This helps the user to better place the primitives and create a better model from the image.

20 Claims, 12 Drawing Sheets

THREE DIMENSIONAL MODELING SYSTEM WITH VISUAL FEEDBACK

1. THE BACKGROUND OF THE INVENTION a. The Field of the Invention

This invention relates to the field of three dimensional computer modeling. In particular, the invention describes an process to build and display a three dimensional model of physical objects from a two dimensional image of the physical objects.

b. Background Information

Many computer programs are now available to create three-dimensional models. However, making the process of creating a three-dimensional model simple and easy to accomplish with helpful feedback has become a challenging task. In some previous systems, a user, using a standard Computer Aided Design (CAD) program, can create a model from measurements of the physical objects and physical space. For example, 3D models are created by measuring the dimensions of physical objects and entering the shape, size, and relative position of the physical object in the model by the appropriately calculated coefficients of the object's geometric formula. Almost any geometric shape can be entered in such a format. Entering this information and displaying it to the user in a manner that allows easy review, feedback and modification has not been adequately addressed by prior art systems.

Some prior art systems create a three-dimensional model from an input file created by the user. A user writes the mathematical formula for the geometric shapes in a list format. A specific format must be followed. The program then reads the input file, creates the primitives in the order they are listed and displays them to the user. During the creation of the list of objects, the user has no visual feedback as to the size or location of an object. This lack of visual feedback makes creating the model difficult for the user.

Other systems have provided dialog boxes or preset formats for entering the coefficients of geometrical shapes. For example, in the AutoCAD™ CAD program by clicking on a tool icon, a dialog box displays the parameters that must be entered to create a certain geometric primitive. The user then enters the required coefficients to create the primitive. The user relies on the program to enter the data in the correct format. Then, the individual primitive can be displayed immediately to the user. However, there is no feedback displaying the discrepancies between the 3D model and the actual arrangement of physical objects being modeled nor conflicts between individual primitives.

In other systems the computer displays the primitives and indicates locations where primitives conflict. For example, the program will show where two solid objects overlap in the 3D model. However, this is all information about elements of the model relative to other elements of the model itself. There is no feedback of how the model's appearance compares or conflicts with the actual appearance of the objects to the viewer or to an image of the objects.

Therefore, what is needed is a method and apparatus that allows a user to easily create a 3D model that looks like the physical objects and space and provides feedback of discrepancies between the model and an actual image of the objects.

2. A SUMMARY OF THE INVENTION

A three dimensional modeling system with feedback is described.

One embodiment of the invention includes a method of generating a 3D model from an image using a computer system. The image is of an arrangement of physical objects. The method comprises the following. Display the image. Create a 3D model primitive to represent at least a portion of a physical object in the image by specifying a set of parameters that correspond to a first set of locations of the primitive on the image. Modify the primitive to make it more closely match the location of the physical object in the image by specifying a second set of locations on the image for the primitive. Display a 2D representation of the primitive, including displaying a difference between the first set of locations and the second set of locations of the primitive on the image. In one embodiment, displaying the difference between the first set of locations and the second set of locations helps a user to see where the user is moving part a primitive from. This helps the user to better place the primitives and create a better model from the image.

In one embodiment, the difference between the first set of locations and the second set of locations is shown using a rubber banding line.

Although many details have been included in the description and the figures, the invention is defined by the scope of the claims. Only limitations found in those claims apply to the invention.

3. A BRIEF DESCRIPTION OF THE DRAWINGS

The figures illustrate the invention by way of example, and not limitation. Like references indicate similar elements.

4. THE DESCRIPTION a. An Overview of an Embodiment of the Invention

A method for creating a three dimensional model of a room and displaying the difference between a first approximate model and a more accurate second model is described.

In one embodiment, a computer system is coupled to a display and a digital camera. A picture of a room and its furnishings is taken and shown on the display. A user then creates a 3D model of the room by creating wireframe primitives that approximate the shape, size and location of the objects in the picture. The primitives are displayed on top of the picture. The user then creates a second 3D model that is more accurate by adjusting each primitive to more accurately match the location and size of each object in the picture. Rubber banding lines between the first 3D model and the second 3D model is then displayed to help the user see where a vertex was moved.

b. System View

Figure 1:
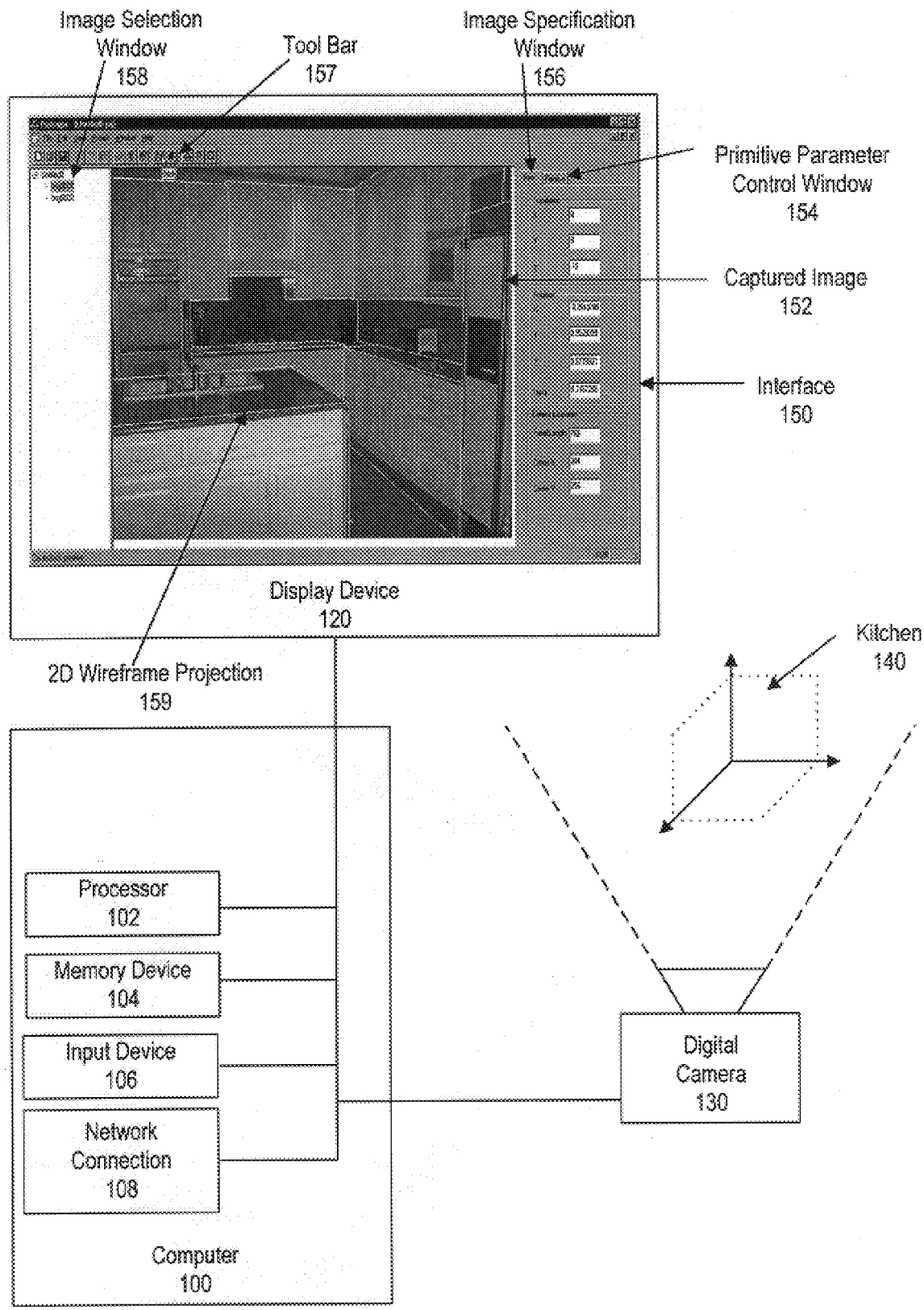
FIG. 1 illustrates a system view of one embodiment of the invention.

FIG. 1 illustrates a system view of one embodiment of the invention that can be used to create a 3D model from an image. The following paragraphs first describe the elements in FIG. 1, then the coupling between those elements, and then the functions of the various elements of the system.

FIG. 1 includes the following elements: a computer 100, a display device 120, a digital camera 130, and a kitchen 140. The computer 100 includes a processor 102, a memory device 104, an input device 106, and a network connection 108. The display device 120 includes an interface 150, a captured image 152, a primitive parameters control window 154, an image specification window 156, a tool bar 157, an image selection window 158, and a 2D wireframe projection 159.

The following paragraph describes the coupling of the elements of FIG. 1. The computer 100 couples to the digital camera 130 and the display device 120. The elements within the computer 100 are coupled as follows. The processor 102, the memory 104, the input device 106, and the network connection 108 communicate via a bus.

The following paragraph describes the function of the elements of FIG. 1. The digital camera 130 captures images of any object within its field of view. For example, in this example the digital camera 130 is capturing images of the objects in the kitchen 140. The captured images are communicated to the computer 100.

The computer 100 is, in various embodiments of the invention, for example, a personal computer (such as a Macintosh™ computer, an IBM compatible personal computer, or a network computer), a workstation (such as a Sun™ workstation or a workstation from Silicon Graphics Corporation), or a palm top computer.

The memory 104 stores the data (e.g., digital image 370) and instructions (e.g., programs) for the processor 102. The memory 104 represents general data storage areas for the computer 100. The memory 104, in various embodiments of the invention, includes, for example, RAM, hard disks, network storage area, and ROM. The instructions for the processor 102 are stored as programs, applications, processes and/or threads.

The memory 104 also stores information for the display device 120. This information includes the display data. The display data include the interface 150.

The input device 106 also includes a mouse or other input device. The input device 106 allows the user to select various elements of the interface 150.

The network connection 108 couples the computer 100 to a computer network, such as a local area network. The network connection 108, in one embodiment, includes a network interface card from 3COM, Corporation of Santa Clara, Calif. The network connection 108 is optional. In one embodiment, the computer 100 includes a number of computers coupled together by network connections.

The interface 150, as noted above, includes the captured image 152, the primitive parameter control window 154, the image specification window 156, the tool bar 157, the image selection window 158 and the 2D wireframe projection 159. The captured image 152 corresponds to the image captured by the digital camera 130.

The primitive parameter control window 154 displays the parameters defining a selected primitive. A primitive is a building block used in 3D models. The primitive parameter control window 154 also allows the user to enter specific parameters.

The image specification window 156 displays and allows the user to enter the location and orientation from which the captured image 152 was taken using the digital camera 130. The image specification window 156 also displays, and allows the user to enter, optical parameters of the digital camera 130.

The tool bar 157 allows the user to select various tools for creating a 3D model. In the example of FIG. 1 the "brick" tool is selected to help the user create a rectangular wireframe primitive.

The image selection window 158 allows the user to select between different images. For example, in FIG. 1 two images of a kitchen are available to be selected. An indicator shows that the image "img001" is selected. The selected image is shown on the interface 150 as the captured image 152.

The 2D wireframe projection 159 is a 2D projection of the 3D model onto the captured image 152.

c. Example Flowchart

Figure 2:
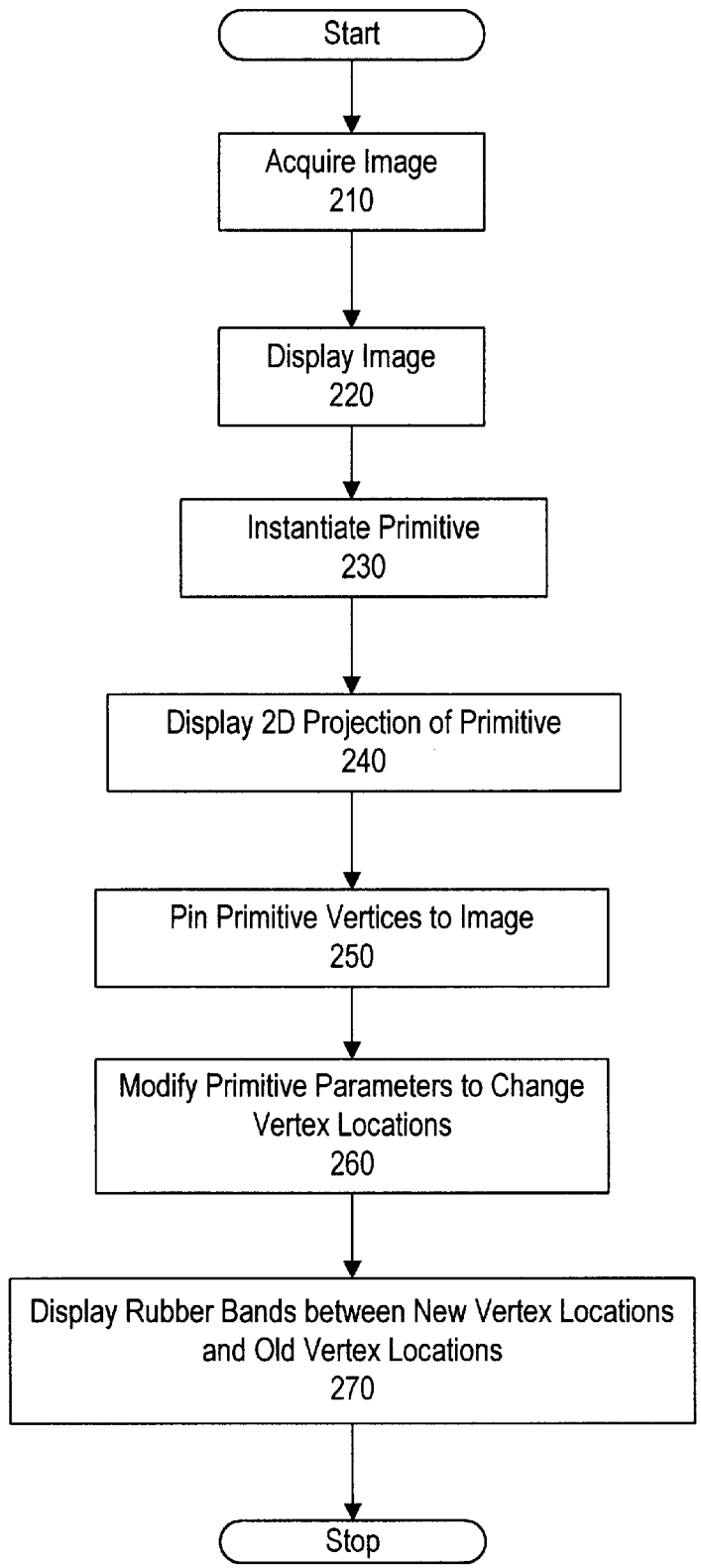
FIG. 2 illustrates one embodiment of a method of generating a 3D model from an image of a kitchen.

FIG. 2 illustrates one embodiment of a method of creating a 3D model and displaying the difference between a first 3D model and a second 3D model. This embodiment can be executed on the system of FIG. 1.

At block 210, an image is acquired. In one embodiment, the image is acquired by taking a picture with a digital camera 130, communicating it to a computer 100, and storing the image in memory 104.

Then at block 220, the captured image 152 is displayed on a display device 120.

At block 230, a 3D primitive is generated. In one embodiment of the invention, the user generates a 3D primitive by selecting a tool from the tool bar 157 and clicking and dragging the 3D primitive onto the captured image 152. In another embodiment, the user generates a 3D primitive by entering parameters into the primitive parameter control window 154.

Then at block 240 the computer 100 superimposes a 2D wireframe projection 159 of the 3D primitive onto the display of the captured image 152.

Next, at block 250 the vertices of the primitive are fixed, or pinned, to specific locations in the 3D model. When a vertex is pinned, the computer keeps track of the pinned location. If the primitive is moved or adjusted without unpinning the vertex, a rubber banding line is drawn from the new vertex location to the vertex's pinned location. In one embodiment of the invention, the user pins the vertices to and unpins the vertices from specific locations by selecting each vertex using a input device 106.

Figure 3:
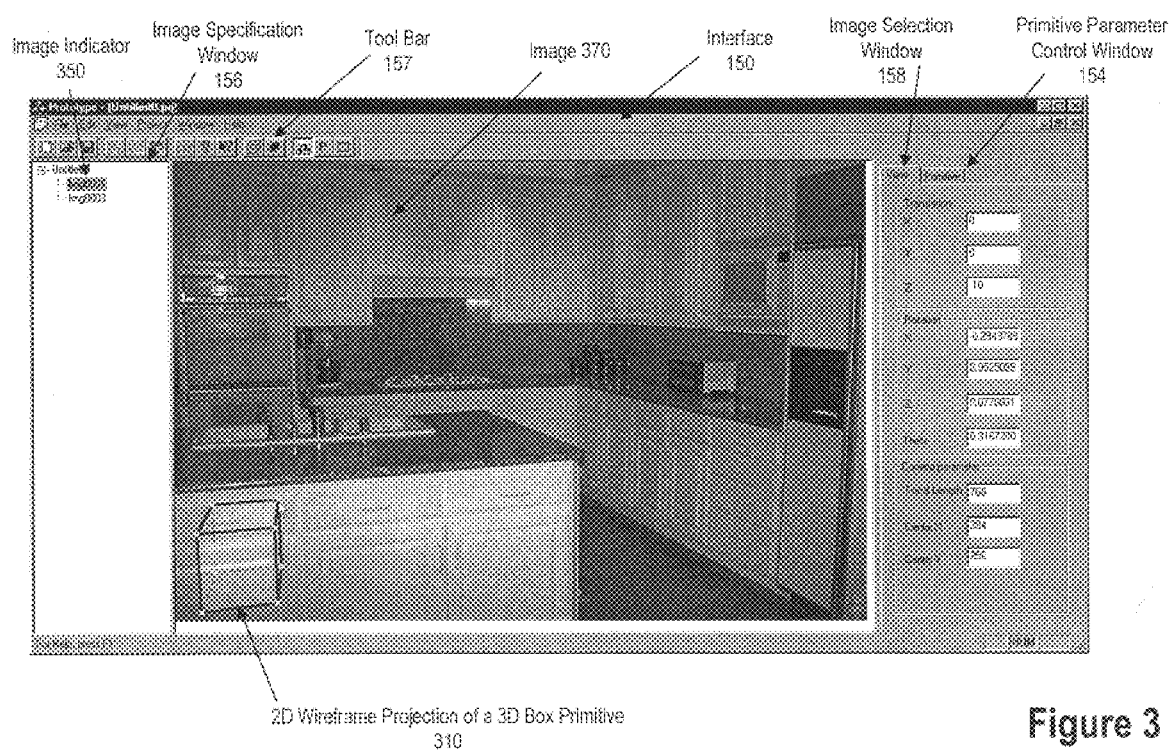
FIG. 3 illustrates a model window including a display of a primitive.
Figure 4:
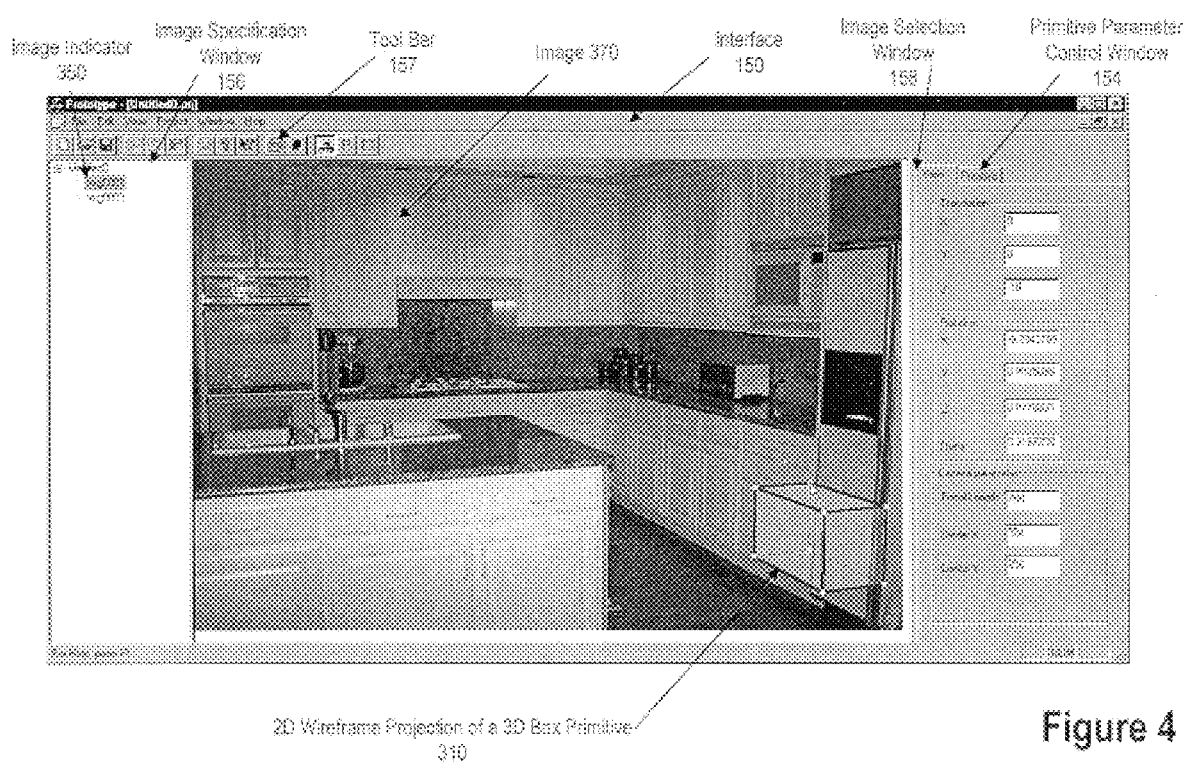
FIG. 4 illustrates the view of the primitive shown in FIG. 3 with the primitive moved to a different location.

For example, in one embodiment of the invention, the current location of a 3D box primitive is defined by three vertex locations $(x_K, y_K, z_K)$, $(x_L, y_L, z_L)$, and $(x_M, y_M, z_M)$. In addition, three variables $(x_{Kp}, y_{Kp}, z_{Kp})$, $(x_{Lp}, y_{Lp}, z_{Lp})$, and $(x_{Mp}, y_{Mp}, z_{Mp})$ are created to record the pinned vertex locations. When the 3D box primitive is created, the current vertex locations and pinned vertex locations are the same. Whenever a current vertex location is the same as its pinned vertex location, no rubber banding lines 810 are drawn between the two locations. In addition, if the primitive is moved without pinning any of the vertices, the new current vertex locations are simply copied into the pinned vertex locations. Therefore, absent any pinning, the current vertex locations and pinned vertex locations are always the same and no rubber banding lines 810 are displayed. A comparison of FIGS. 3 and 4 illustrates the absence of rubber banding lines 810 when a 3D box primitive is moved without pinning any vertices of the 3D box primitive.

Figure 7:
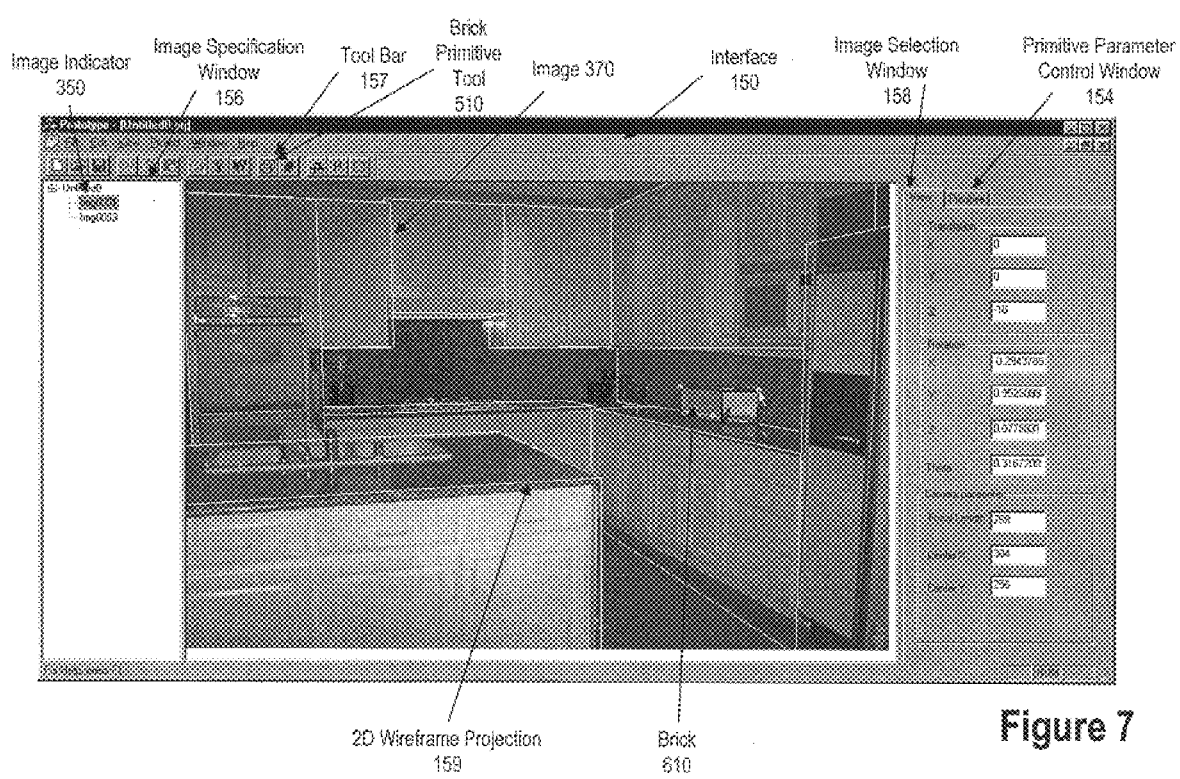
FIG. 7 illustrates positioning and modifying the parameters of a primitive to correspond to the approximate location of the physical object and pinning down the vertex locations.
Figure 8:
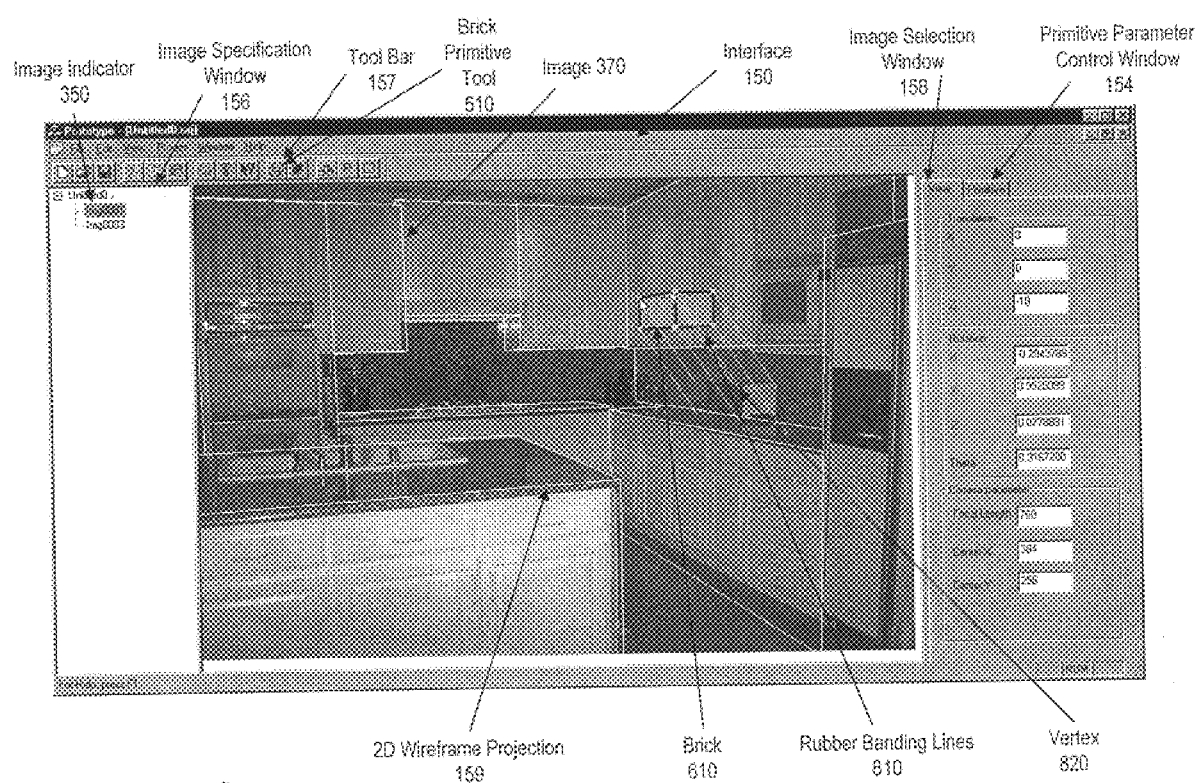
FIG. 8 illustrates displaying the rubber bands which indicate the difference between the primitive's vertex locations in FIG. 7 and the new primitive vertex locations after dragging the primitive.

A rubber banding line 810, however, is displayed if a vertex of a primitive is pinned and the primitive is subsequently moved. For example, if vertex K is pinned by selecting it with a input device 106, variable $(x_{Kp}, y_{Kp}, z_{Kp})$ is permanently set to its current location until it is unpinned. Therefore, when the 3D box primitive, including vertex K, is moved, the new current vertex K location $(x_K, y_K, z_K)$ will be different from vertex K's pinned location $(x_{Kp}, y_{Kp}, z_{Kp})$ and a rubber banding line (810) will be displayed between vertex K's current location $(x_K, y_K, z_K)$ and its pinned location $(x_{Kp}, y_{Kp}, z_{Kp})$. A comparison of FIGS. 7 and 8 illustrates the displaying of rubber banding lines 810 when the vertices of a 3D box primitive are pinned and the primitive is then moved.

Figure 9:
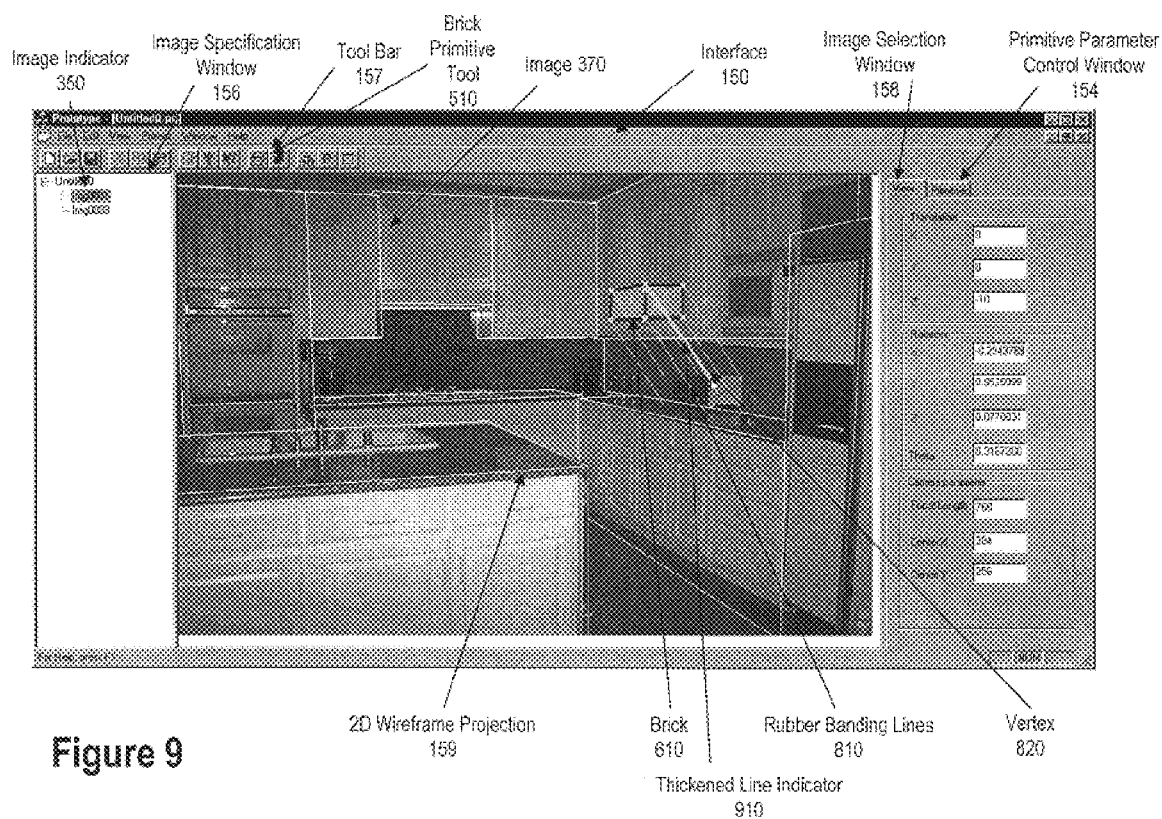
FIG. 9 illustrates adjusting a vertex of a primitive and displaying the adjustment.

At block 260 the primitive parameters are modified to change the vertex locations. The principal reason for moving a vertex is to more closely align the 2D projection of the primitive with the image of its corresponding physical object in the captured image 152. For example, in FIG. 8, the vertex 820 of a box primitive is not aligned with the upper, front, right hand corner of the toaster oven that it represents. In FIG. 9, the vertex 820 has been moved so that its 2D projection is aligned with the corner it represents. In one embodiment of the invention, the vertex locations are modified by clicking and dragging a vertex or vertices to different locations using a input device 106.

Finally, at block 270, the computer displays the difference between the new vertex locations and the old vertex locations to help the user see where a vertex was moved.

d. Example Screen Displays

FIG. 3 illustrates the interface 150 including the image indicator 350, an image 370 and a 2D wireframe projection of 3D box primitive 310. The mouse indicator is located at one vertex of the 3D box primitive.

FIG. 4 illustrates the view of the 2D wireframe projection of a 3D box primitive 310 shown in FIG. 3 in the same orientation in the 3D model but translated to a different location. The reason for including FIG. 4 in this specification is to show that moving the 2D projection of a primitive on the display device 120 to a different location on the display moves the primitive in the 3D model rather than merely moving a static 2D representation of the primitive to a different part of the display.

For example, in one embodiment of the invention, when a user drags the 2D projection of a 3D box primitive 310 across the display device, the primitive is moved in the 3D model and the computer 100 continuously recalculates the 2D projection of a 3D box primitive 310 onto the captured image 152 from the digital camera's 130 viewpoint specified in the image specification window 156. Therefore, 2D projections of the same primitive are different depending on where the primitive is located in the 3D model. A comparison of FIGS. 3 and 4 illustrates how the 2D projection of a 3D box primitive 310 changes when it is dragged across the screen.

Figure 5:
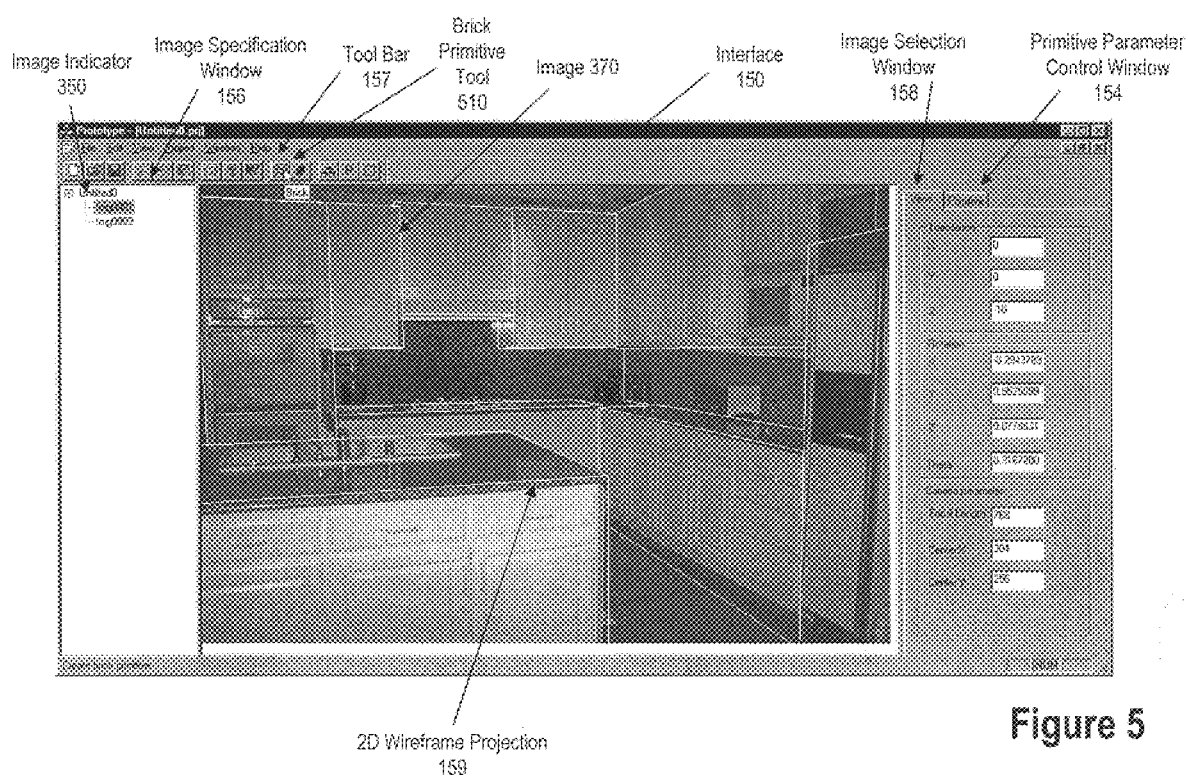
FIG. 5 illustrates the image with most of the 3D model constructed.

FIG. 5 illustrates an enlarged view of the 2D wireframe projection 159 of a nearly complete 3D model of a kitchen. It also illustrates the selection of the brick primitive tool 510 from the tool bar 157. In one embodiment of the invention, the user can create a 3D box primitive, also called a brick, by clicking and dragging the brick primitive tool 510 onto the image with a input device 106.

Figure 6:
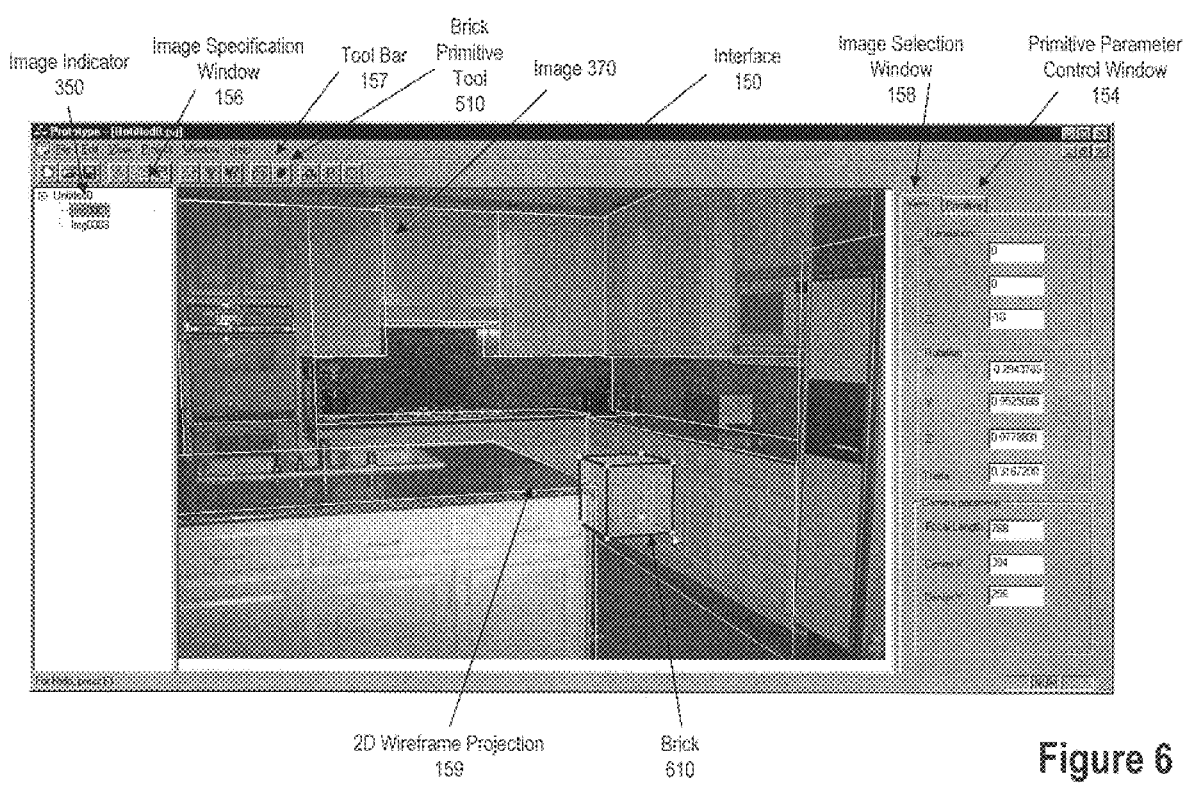
FIG. 6 illustrates creation of a primitive to represent a physical object (a toaster oven).

FIG. 6 illustrates one example of generating a primitive such as brick 610. In on embodiment of the invention having an object oriented design, this involves instantiating an instance of a brick primitive.

FIG. 7 illustrates modifying the parameters of the brick 610 primitive in FIG. 6 to correspond to the approximate location and size of a toaster oven in the kitchen 140 and pinning the vertices to locations in the 3D model. In one embodiment of the invention, pinning a vertex to a specific location is effectuated by selecting the vertex with the input device 106.

FIG. 8 illustrates the rubber banding lines 810 resulting from moving the toaster oven primitive shown in FIG. 7 to a different location. FIG. 8 also shows vertex 820 is not perfectly aligned with the top, front, right-hand corner of the toaster oven to which the vertex 820 corresponds. In one embodiment of the invention, the brick 610 can be moved by dragging it to a new location using the input device 106.

FIG. 9 illustrates modifying a pinned vertex location. In FIG. 9 the pinned vertex 820 has been moved from its location in FIG. 8 to more accurately represent the top, front, right-hand corner of the toaster oven. In one embodiment of the invention, the modification of the old vertex location is indicated with a thickened line indicator 910 to help the user identify which vertex the user is modifying.

Figure 10:
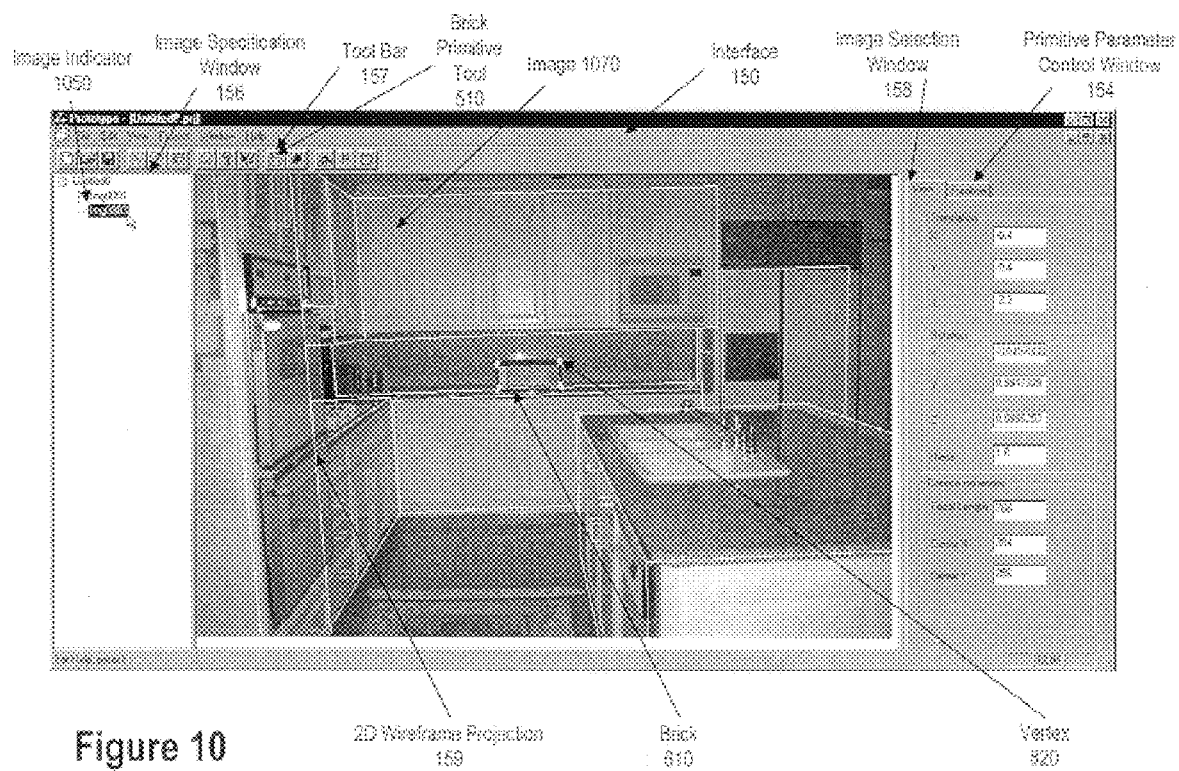
FIG. 10 illustrates a display of a second image of the same kitchen from a second perspective including the 3D model primitives.

FIG. 10 illustrates the display of a second image of the objects being modeled. In FIG. 10 the image indictor 1050 indicates which image 1070 is displayed as the captured image 152. Although a second image is not necessary to practice the invention, a second image allows the user to create a more accurate 3D model of the objects than if only a single image is used.

For example, in one embodiment of the invention, a first image is taken by a digital camera 130 pointed in a direction parallel to the z axis of the 3D model and a second image is taken by the same digital camera 130 pointing in a direction parallel to the x axis. Using the first image, the user can accurately specify the x and y values of each primitive in the 3D model but not the z values. Only two dimensions of the 3D model are accurately specified while the third dimension, the z values, may be completely inaccurate. By using the second image, however, the user can accurately specify the z values, the third dimension, of each primitive in the 3D model.

In another embodiment of the invention, more than two images are used to create a 3D model.

Figure 11:
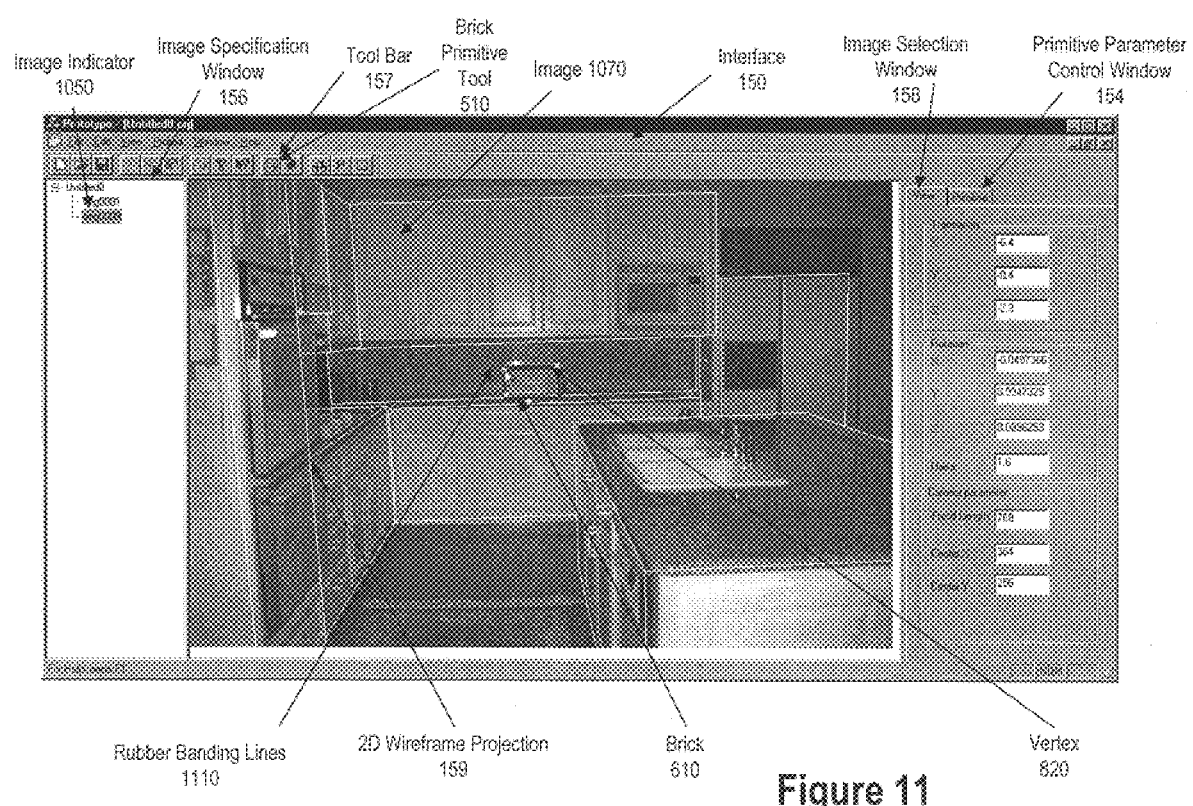
FIG. 11 illustrates resizing and pinning down vertices of a primitive to an approximate location of the object in the second image.

FIG. 11 illustrates one example of using a second image of an object to resize a primitive to more accurately represent the object to which it corresponds. Comparison of FIGS. 10 and 11, shows that the brick 610 primitive that represents the toaster oven has been shortened to more accurately represent the width of the toaster oven. Rubber banding lines 1110 are displayed to show the adjustment.

Figure 12:
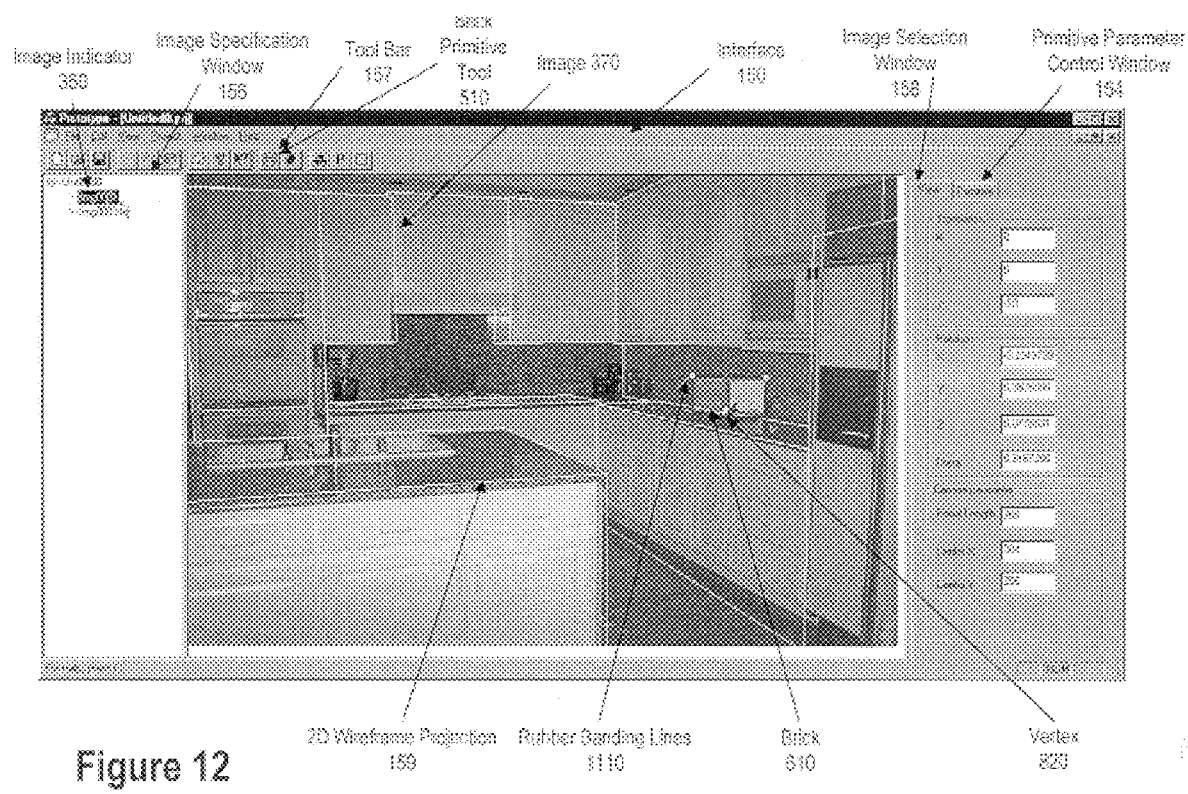
FIG. 12 illustrates rubber bands from the first image.

FIG. 12 illustrates the same rubber banding lines 1110 shown in FIG. 11 from a different perspective. Thus, the rubber banding lines 1110 help the user understand how the changes to the model in relation to image 1070 affected the model in relation to image 370.

e. Additional Embodiments

Other embodiments of the invention include other features, in addition to and/or in exchange for, features described above. The following describes some of these embodiments.

Some embodiments of the invention use other primitives to construct the 3D model. For example, in one embodiment, some of the primitives are displayed as solids with selectable colors and textures. This helps some users better construct the 3D model of the physical objects in the images. Another embodiment includes complex primtives such as, sinks, facets, vent hoods, fire places, tables, chairs, bathtubs, etc. These complex primitives help a user build a model more quickly.

In one embodiment, primitives are displayed in related palettes (e.g., a kitchen fixtures palette, a living room furniture palette). In another embodiment, primitives are included on the tool bar, palettes, or on pull-down menus.

In other embodiments, the rubber band line is replaced by other indicators (e.g., an enhanced initial point). In some embodiments, dimension values are displayed indicating the distance between the initial point of a vertex and an ending point.

In other embodiments, the user can drag entire lines, planes, or other parts of primitives to modify the primitives. In these embodiments, the difference between the starting points and the ending points are shown, for example, in different colors, or using a pattern or texture which defines the area between the start and end points.

In another embodiment of the invention, when a user completes a move of a primitive, or part of a primitive, the user can force the primitive to snap back (as in, snap back using the rubber band lines to your original location) to the primitives original location. In one embodiment, this is done as an undue command. In another embodiment, this is done using a snap back command.

In other embodiments, the digital camera is not included. In some of the embodiments, the image is obtained from a scanned photograph, a 3D rendered image, or a 3D composited image, for example.

In some embodiments, once the user has anchored some vertices of an object, the computer 100 solves for the locations of the remaining vertices (optionally, this solving process can be done in real-time). This solving process takes into account, for example, the geometry of the object, the location of anchored vertices, and the lense characteristics of the camera used to generate the captured image 152. If the user moves one of the vertices of the object, this solving process may have to move other, previously anchored, vertices. Rubber banding lines are automatically drawn between the newly solved vertices locations and the previously anchored locations. Thus, these embodiments provide feedback to the user about how the object is effected by the solving process. Other embodiments of the invention allow the geometry of the object to be relaxed during the solving process (e.g., the box shape is not required to maintain parallel opposing surfaces), which may reduce the movement from the anchored vertices locations. However, rubber-banding lines are still shown to the user.

f. Conclusion

What has been described is a method of creating a 3D model of an arrangement of physical objects and providing visual feedback of changes in the model and differences between a 2D projections of the model compared to images of the arrangement of physical objects.

What is claimed is:

1. A method of generating a 3D model from an image using a computer system, said image being an image of physical objects, said method comprising:

displaying said image;

creating a primitive, said primitive representing at least a portion of a first physical object of said physical objects, said primitive having a set of parameters defining a size and location of said primitive in said 3D model, said set of parameters causing parts of said primitive to correspond to a first set of locations on said image, said first set of locations corresponding to a first approximate location of said first physical object in said image;

modifying said set of parameters to cause said parts of said primitive to correspond to a second set of locations on said image; and, displaying a 2D representation of said primitive including displaying a difference between said first set of locations and said second set of locations.

2. The method of claim 1 wherein said primitive includes a plurality of vertices and wherein creating said primitive includes assigning values to said set of parameters to cause said plurality of vertices to correspond to said first set of locations when said primitive is displayed as said 2D representation.

3. The method of claim 1 wherein said primitive includes a plurality of vertices and wherein creating said primitive includes displaying a first 2D representation of said primitive, said plurality of vertices being displayed in said first 2D representation and corresponding to said first set of locations on said image.

4. The method of claim 1 wherein said primitive includes a plurality of vertices and wherein modifying said set of parameters includes changing values of said set of parameters to change a location of at least a first vertex of said plurality of vertices in said 3D model.

5. The method of claim 1 wherein said primitive includes executing a solver process that results in a change in said set of parameters.

6. The method of claim 1 wherein displaying said difference between said first set of locations and said second set of locations includes displaying a set of lines from said first set of locations and said second set of locations.

7. The method of claim 1 wherein said primitive includes a first point in said 3D model, and wherein displaying said difference between said first set of locations and said second set of locations includes displaying a rubber band line between at least a first location of said first set of locations and a second location of said second set of locations, said first location and said second location corresponding to the location of said first point before and after, respectively, modifying said set of parameters.

8. The method of claim 1 wherein said primitive represents a box and wherein said 2D representation includes a 2D wireframe representation of said box.

9. A system for displaying a box, an image, and a correspondence between said box and said image, said box including a set of vertices, said system comprising:

a display device for displaying said image;

a memory for storing said box and said image; and, a processor, coupled to said display device and said memory, for executing a set of instructions said set of instructions including a first set of instructions to cause a display of said image, a second set of instructions to cause a first 2D representation of said box to be displayed at a first set of locations on said image at a first time and a second 2D representation of said box to be displayed at a second set of locations on said image at a second time, said first set of locations and said second set of locations corresponding to vertices of said box, said second set of locations corresponding to a set of locations of vertices of a box shape in said image, a third set of instructions to cause a display of a difference between said first set of locations and said second set of locations.

10. The system of claim 9 wherein said first 2D representation is different than said second 2D representation.

11. The system of claim 9 display of said difference includes a display of a visual difference indicator.

12. The system of claim 11 wherein said visual difference indicator includes one or more rubber banding lines.

13. The system of claim 9 wherein said set of instructions includes a fourth set of instructions for causing a drag and drop of a 2D representation of said vertices of said box from said first set of locations to said second set of locations.

14. A method of displaying feedback to a user about the location of a 3D modeling primitive in a 3D model and a corresponding shape in a 2D image using a computer, said method comprising:

displaying said 2D image;

generating said 3D modeling primitive;

displaying a first 2D representation of said 3D modeling primitive at a first location on said image;

modifying values of said 3D modeling primitive to cause at least a portion of said 3D modeling primitive to be located at a second location, said second location at least partially corresponding to the location of said shape in said 2D image; and, displaying a difference between said first location and said second location.

15. The method of claim 14 wherein displaying said difference includes displaying a line between said first location to said second location.

16. The method of claim 15 further comprising displaying an enhanced line between said first location and said second location and modifying values corresponding to said first location to locate said location at a third location.

17. The method of claim 16 wherein said enhanced line includes a thickened rubber band line graphic.

18. The method of claim 14 wherein modifying values includes:

displaying a second 2D image of said shape; and displaying a second 2D representation of said 3D modeling primitive at a third location on said second 2D image; and modifying values of said 3D modeling primitive to cause at least a portion of said 3D modeling primitive to be located at a fourth location on said second 2D image, wherein said fourth location corresponds to said second location.

19. The method of claim 18 further comprising displaying a second difference between said third location and said fourth location.

20. The method of claim 14 wherein displaying said difference includes displaying one or more rubber banding lines between said first location to said second location.

* * * * *